United States Patent
Lee et al.

(10) Patent No.: US 7,773,838 B2
(45) Date of Patent: Aug. 10, 2010

(54) METHOD AND NETWORK ARCHITECTURE FOR UPGRADING LEGACY PASSIVE OPTICAL NETWORK TO WAVELENGTH DIVISION MULTIPLEXING PASSIVE OPTICAL NETWORK BASED NEXT-GENERATION PASSIVE OPTICAL NETWORK

(75) Inventors: Chang-Hee Lee, Daejeon (KR); Ki-Man Choi, Daegu (KR); Sil-Gu Mun, Daegu (KR); Jung-Hyung Moon, Pusan (KR); Hoon-Keun Lee, Kyungbuk (KR)

(73) Assignee: LG-Nortel Co., Ltd., Seoul (KR)

( * ) Notice: Subject to any disclaimer, the term of this patent is extended or adjusted under 35 U.S.C. 154(b) by 0 days.

(21) Appl. No.: 12/513,741

(22) PCT Filed: Nov. 14, 2006

(86) PCT No.: PCT/KR2006/004767
§ 371 (c)(1),
(2), (4) Date: May 6, 2009

(87) PCT Pub. No.: WO2008/056843
PCT Pub. Date: May 15, 2008

(65) Prior Publication Data
US 2010/0054740 A1 Mar. 4, 2010

(30) Foreign Application Priority Data
Nov. 7, 2006 (KR) ................... 10-2006-0109544

(51) Int. Cl.
*G02B 6/28* (2006.01)
(52) U.S. Cl. ................................. 385/24; 385/15
(58) Field of Classification Search ............ 385/15, 385/24
See application file for complete search history.

(56) References Cited
U.S. PATENT DOCUMENTS
6,778,550 B1 * 8/2004 Blahut ..................... 370/443

7,408,955 B2 * 8/2008 Choi et al. ............... 370/468
2003/0138252 A1    7/2003 Paiam et al.
2004/0184806 A1    9/2004 Lee et al.
2006/0239682 A1   10/2006 Park et al.

OTHER PUBLICATIONS

International Search Report dated Jul. 30, 2007.
Ohara et al., "Traffic Analysis of Ethernet-PON in FTTH Trial Service," Optical Fiber Comm., Technical Digest, Anaheim, CA, Mar. 2003, vol. 2, pp. 607-608.
* cited by examiner

*Primary Examiner*—Jennifer Doan
(74) *Attorney, Agent, or Firm*—Ked & Associates, LLP

(57) ABSTRACT

The present invention discloses a network architecture for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises: a central office (CO) having a first optical line termination (OLT); a remote node (RN) having a splitter; a single mode fiber (SMF) connecting the first OLT and the splitter; and a first group of one or more optical network terminations (ONTs) being connected to the splitter by a first group of one or more distribution fibers, and wherein the network architecture further comprises: in case that the next-generation PON is a WDM-PON, a first apparatus for combining and splitting wavelength bands being positioned between the SMF and the first OLT, in order to add a second OLT to be used for the WDM-PON within the CO or within another CO which is located in a position different from the CO, while sharing the SMF; a second apparatus for combining and splitting wavelength bands being positioned at a front terminal of the splitter; and an arrayed waveguide grating (AWG) being connected to the second apparatus for combining and splitting wavelength bands within the RN, and being connected to a second group of one or more ONTs by a second group of one or more distribution fibers within the RN or within another RN which is located in a position different from the RN.

23 Claims, 5 Drawing Sheets

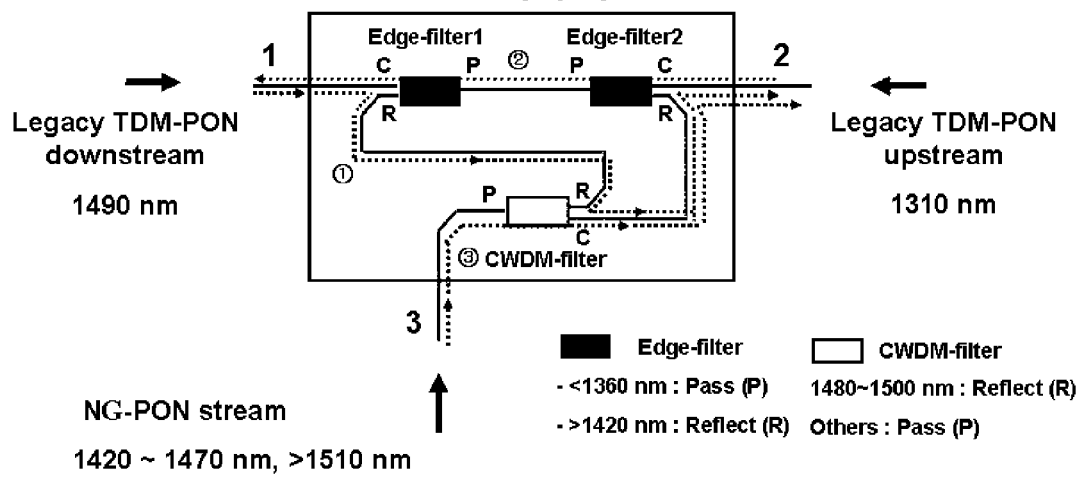
[Fig. 1]
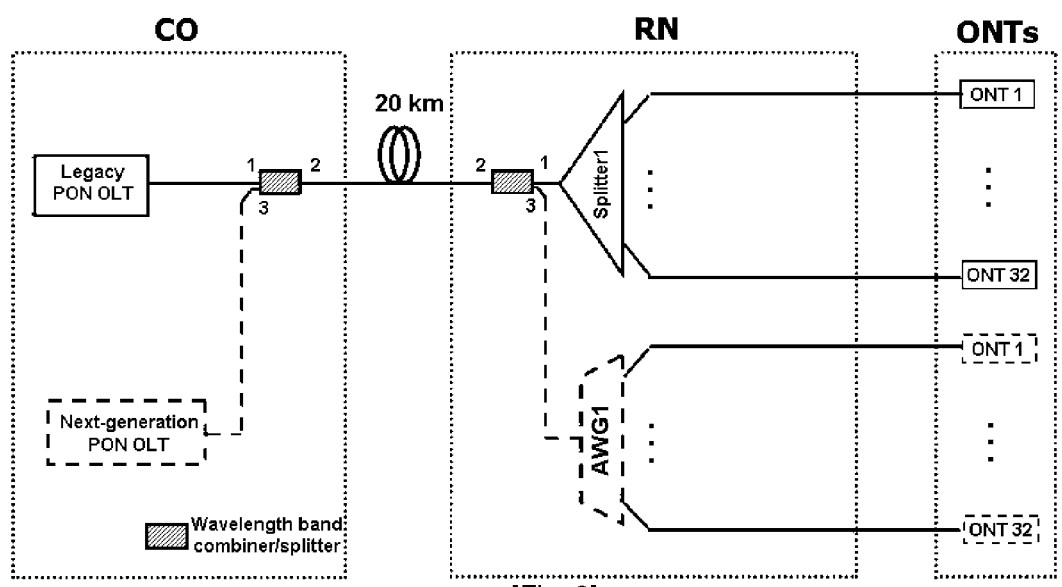
[Fig. 2]
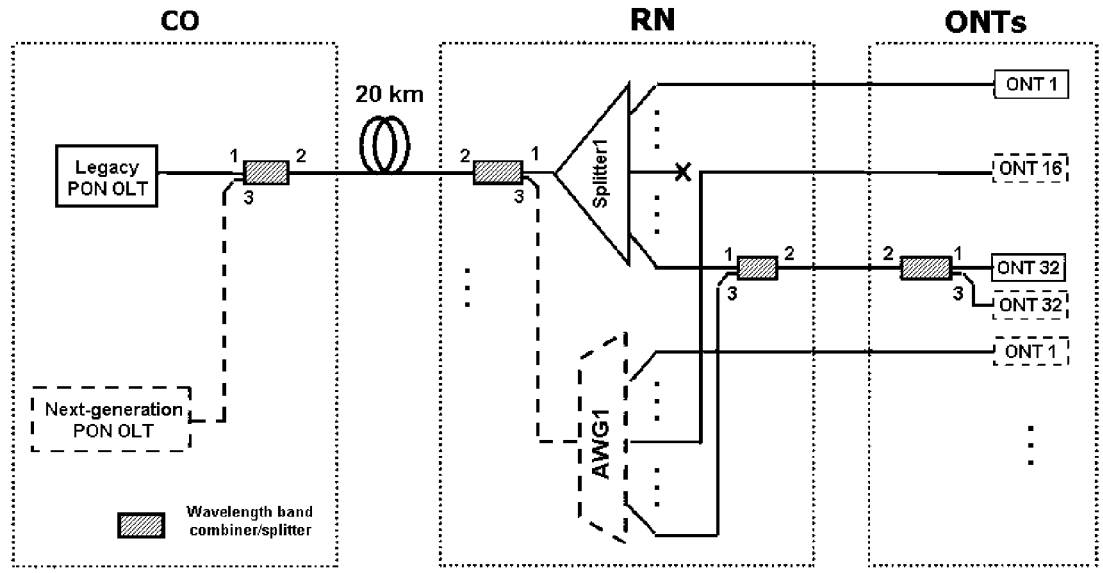
[Fig. 3]

[Fig. 4]
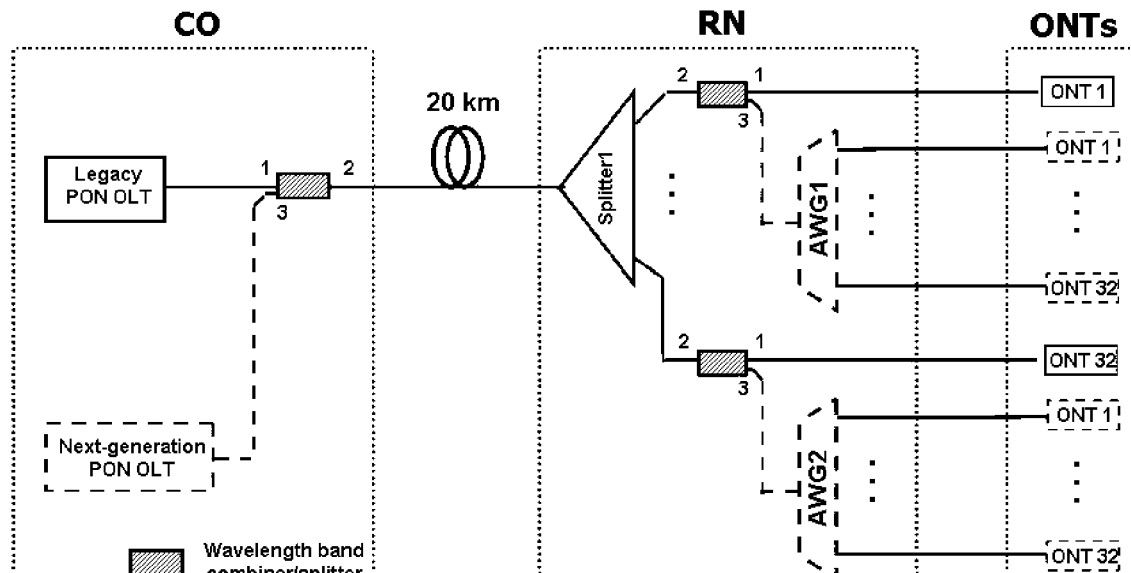
[Fig. 5]
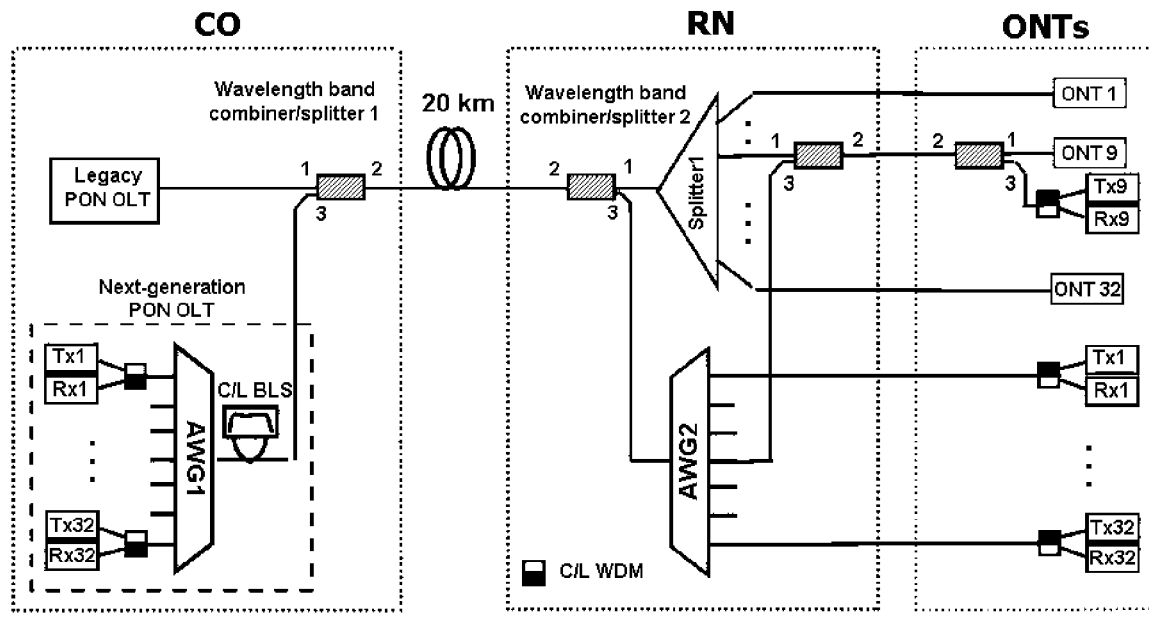

[Fig. 6]
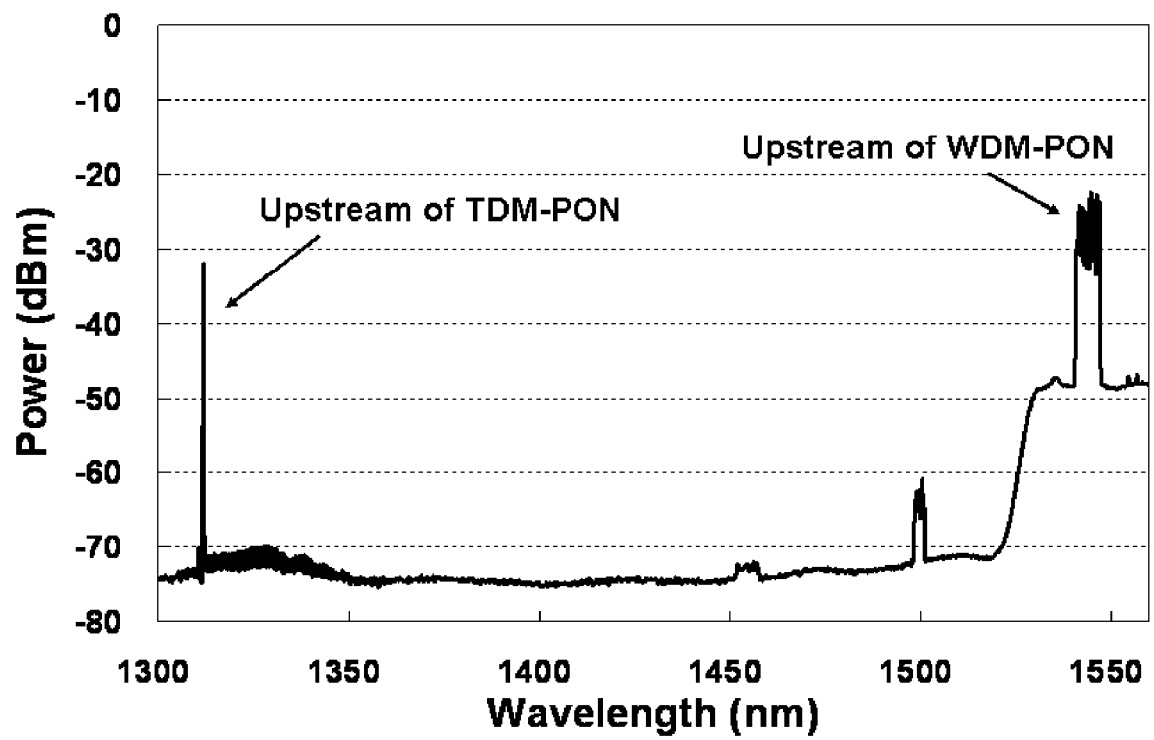
[Fig. 7]
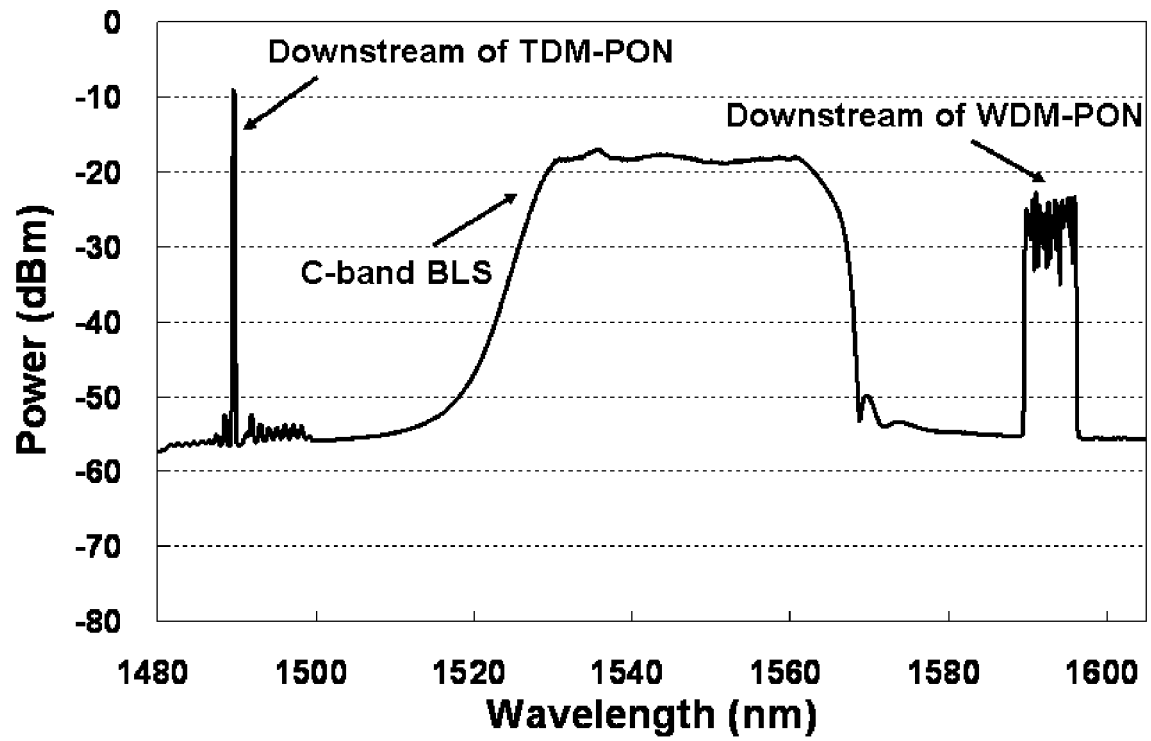

[Fig. 8]
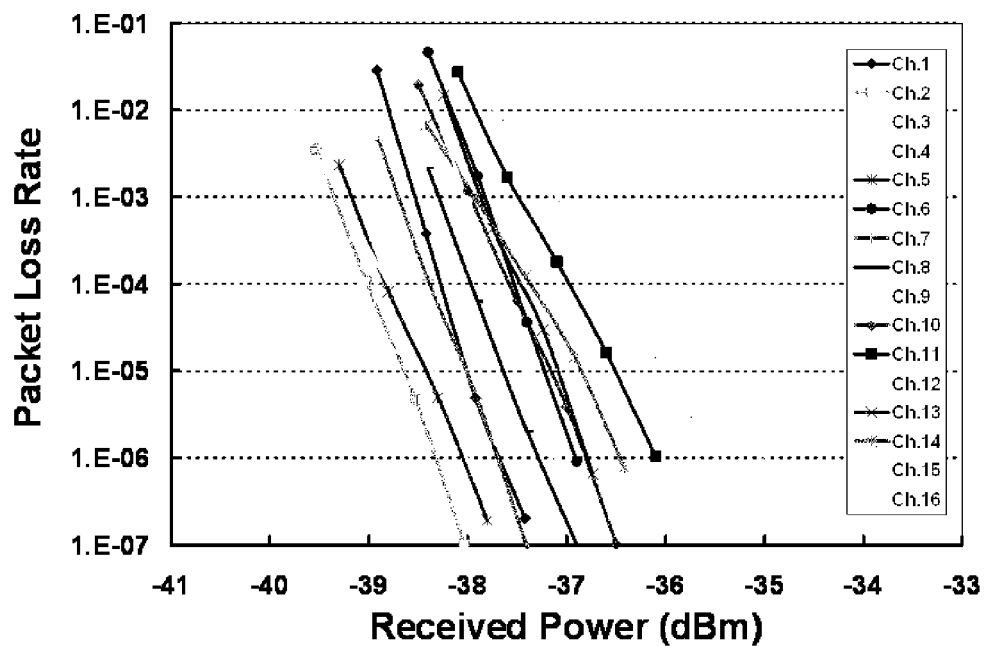
[Fig. 9]
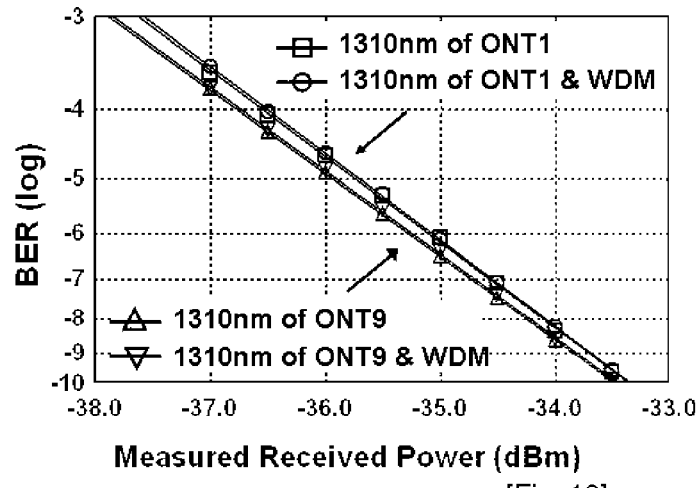
[Fig. 10]
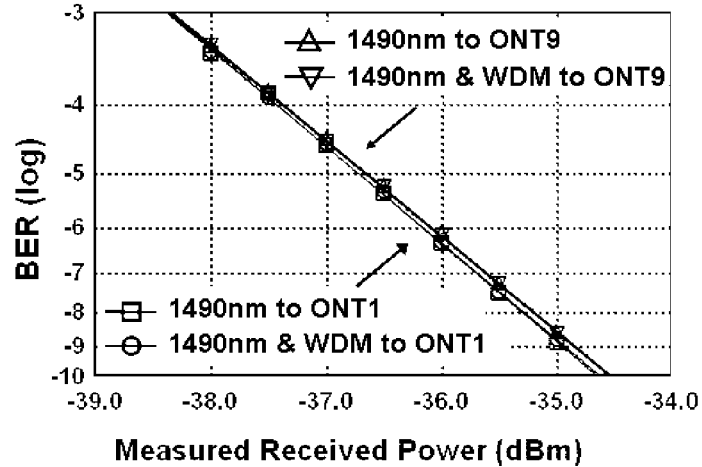

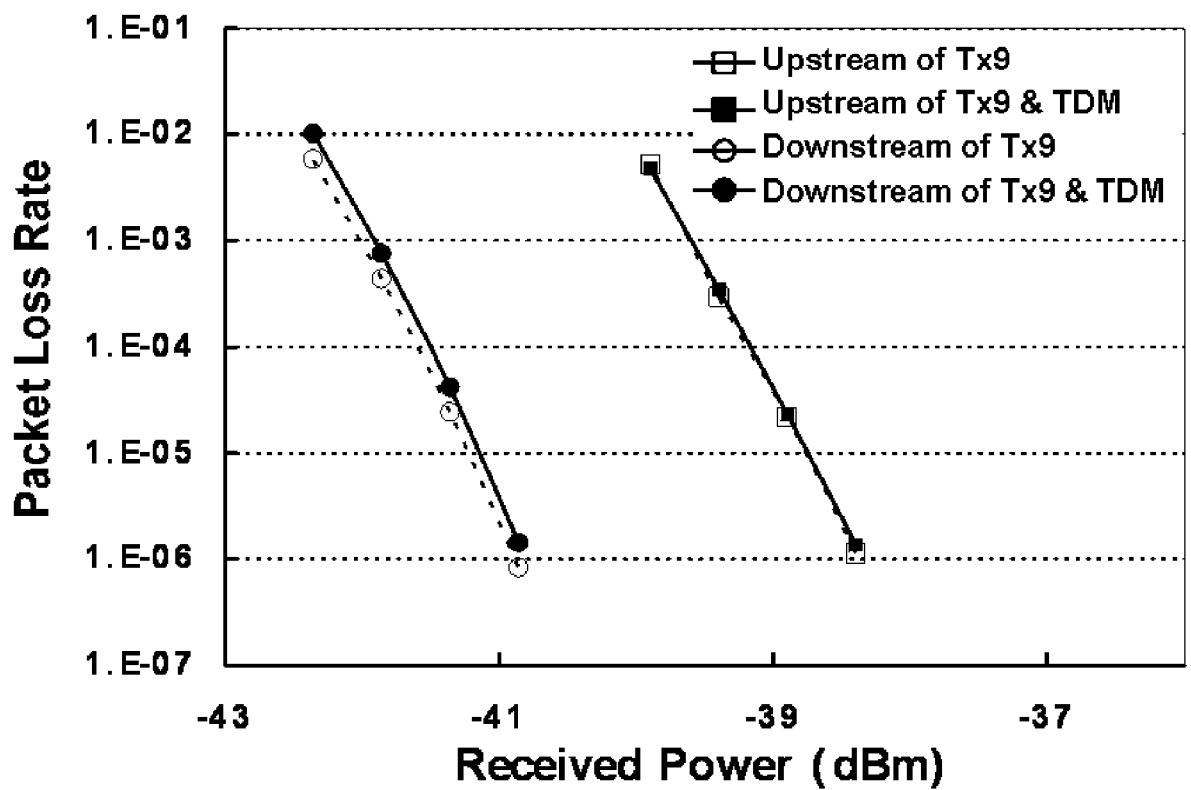
[Fig. 11]

METHOD AND NETWORK ARCHITECTURE FOR UPGRADING LEGACY PASSIVE OPTICAL NETWORK TO WAVELENGTH DIVISION MULTIPLEXING PASSIVE OPTICAL NETWORK BASED NEXT-GENERATION PASSIVE OPTICAL NETWORK

TECHNICAL FIELD

The present invention relates to a method and a network architecture for upgrading a legacy passive optical network to a wavelength division multiplexing passive optical network (WDM-PON) based next-generation passive optical network. More specifically, the present invention relates to a method and a network architecture for upgrading a previously installed legacy time division multiplexing-passive optical network (TDM-PON) to a WDM-PON based next-generation passive optical network in order to provide a higher bandwidth and to increase the number of subscribers, while maintaining services through the legacy TDM-PON.

BACKGROUND ART

A prior art access network using copper wires employs, for example, a digital subscriber line (xDSL, where x refers to different variants of DSL, such as ADSL, VDSL, etc.) using telephone lines and a cable modem technology, etc. using a coaxial cable. This prior art access network has a disadvantage that a bandwidth may be limited depending on a transmission distance. Thus, only one single method to overcome the limit of a transmission distance is to use a single mode fiber (SMF) which provides an unlimited transmission bandwidth. It is referred to a fiber-to-the-home (FTTH) method where an SMF is used as a transmission medium and is installed to subscribers so that information is given and taken therethrough. In this case, an FTTH is especially referred to a passive optical network (PON) where the FTTH uses a point-to-multipoint architecture to reduce the number of an SMF necessary for installation from a central office (CO) to subscribers, while being only comprised of passive elements without using active elements/systems.

A PON technology is mainly classified as a TDM-PON and a WDM-PON depending on a method of sharing an optical fiber, and the TDM-PON is referred to a PON which shares one optical fiber using a time division multiple access (TDMA).

The TDM-PON started to be commercialized as a need for the FTTH is required. As specific examples of the TDM-PON, there had been an asynchronous transfer mode (ATM)-PON or a Broadband-PON (hereinafter referred to 'B-PON', while an Ethernet-PON (hereinafter referred to 'E-PON' having a transmission speed of 1 Gb/s was commercialized in the year of early 2000 (See K. Ohara, et al., "traffic analysis of Ethernet-PON in FTTH trial service, *Optical Fiber Comm.* Technical Digest, Anaheim, Calif., pp. 607-608, March 2003).

After that, a Gigabit-PON (hereinafter referred to 'G-PON') capable of transmitting signals with a transmission speed of 2.5 Gb/s has been developed, and is now at a stage of commercialization.

However, in a TDM-PON, upstream and downstream transmission speeds are fixed at constant standard speeds depending on the kinds of the PON and a plurality of subscribers shares the TDM-PON commonly so that a bandwidth per each subscriber to be provided for is reduced when expanding the number of subscribers (i.e., when increasing a split ratio). For example, in a TDM-PON having 32 split ratio, upstream and downstream transmission speeds are approximately 30 Mb/s, respectively, as an average bandwidth per each subscriber to be provided for in case of E-PON (where both of upstream and downstream transmission speeds are 1.25 Gb/s), while upstream and downstream transmission speeds are approximately 36 Mb/s and 72 Mb/s, respectively, as an average bandwidth per each subscriber to be provided for in case of G-PON (where a downstream transmission speed is 2.5 Gb/s and an upstream transmission speed is 1.25 Gb/s). Further, although a higher speed of TDM-PON is required due to the rapid increase of demand for broadband services as the use of internet is increased and image and video services are widely spread, there are many technical problems to be solved to accomplish a higher speed of TDM-PON. Accordingly, a next-generation PON capable of providing broadband service at a low cost is actively discussed by a standard group such as FSAN (Full Service Access Network) or IEEE. Here, one of the requirements for next-generation PON is to use an optical fiber and a splitter which are an already installed infrastructure for a legacy TDM-PON.

DISCLOSURE OF INVENTION

Technical Problem

The object of the present invention is to solve the prior art problems and provide a method and a network architecture for upgrading a previously installed legacy TDM-PON to a WDM-PON based next-generation PON capable of next-generation PON services, which satisfy prior art limits, by using an apparatus for combining and splitting upstream and downstream wavelength bands of the legacy TDM-PON and upstream and downstream wavelength bands of the next-generation PON.

More specifically, an apparatus for combining and splitting wavelength bands which is used for the present invention is embodied by two edge filters and a coarse wavelength division multiplexing (CWDM) filter and enables to embody upgrading a legacy TDM-PON to a next-generation PON simply and effectively by combining and splitting signals of the legacy TDM-PON and signals of the next-generation PON. That is, upgrading a legacy TDM-PON to a next-generation PON can be made very easily by installing an apparatus for combining and splitting wavelength bands as illustrated in FIG. 1 additionally in a CO and a remote node (RN) illustrated in FIGS. 2 to 5 which will be described later, when installing the legacy TDM-PON. In addition, in case that a link margin of the legacy TDM-PON is designed to be enough to compensate for an insertion loss of an apparatus for combining and splitting wavelength bands, it is possible to add an apparatus for combining and splitting wavelength bands later without changing an optical line termination (OLT) or an optical network termination (ONT) of the legacy TDM-PON.

Technical Solution

According to first aspect of the present invention, the present invention provides a method for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises: a central office (CO) having a first optical line termination (OLT); a remote node (RN) having a splitter; a single mode fiber (SMF) connecting the first OLT and the splitter; and a first group of one or more optical network terminations (ONTs) being connected to the splitter by a first group of one or more distribution fibers, and wherein the method for upgrading comprises: in case that the next-generation PON is a WDM-PON, positioning a first apparatus for combining and splitting wavelength bands between the SMF and the first OLT, in order to add a second OLT to be used for the WDM-PON within the CO or within another CO which is located in a position different from the CO, while sharing the SMF; positioning a second apparatus for combining and splitting wavelength bands at a front terminal of the splitter; and installing additionally an arrayed waveguide grating (AWG) within the RN or within another RN which is located in a position different from the RN, wherein the AWG and is connected to the second apparatus for combining and splitting wavelength bands and is connected to a second group of one or more ONTs by a second group of one or more distribution fibers.

According to second aspect of the present invention, the present invention provides a method for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises: a central office (CO) having a first optical line termination (OLT); a remote node (RN) having a splitter; a single mode fiber (SMF) connecting the first OLT and the splitter; and a first group of one or more optical network terminations (ONTs) being connected to the splitter by a first group of one or more distribution fibers, and wherein the method for upgrading comprises: in case that the next-generation PON is a WDM-PON, positioning a first apparatus for combining and splitting wavelength bands between the SMF and the first OLT, in order to add a second OLT to be used for the WDM-PON within the CO or within another CO which is located in a position different from the CO, while sharing the SMF; positioning a second apparatus for combining and splitting wavelength bands at a front terminal of the splitter; and installing additionally an arrayed waveguide grating (AWG) within the RN or within another RN which is located in a position different from the RN, wherein the AWG is connected to the second apparatus for combining and splitting wavelength bands which is located within the RN and is connected to a second group of one or more ONTs by a second group of one or more distribution fibers, and wherein any one of the distribution fiber of the first group of one or more distribution fibers, which is connected to any one ONT of the first group of one or more ONTs, is connected to the AWG, instead of being connected to the splitter.

According to third aspect of the present invention, the present invention provides a method for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises: a central office (CO) having a first optical line termination (OLT); a remote node (RN) having a splitter; a single mode fiber (SMF) connecting the first OLT and the splitter; and a first group of one or more optical network terminations (ONTs) being connected to the splitter by a first group of one or more distribution fibers, and wherein the method for upgrading comprises: in case that the next-generation PON is a WDM-PON, positioning a first apparatus for combining and splitting wavelength bands between the SMF and the first OLT, in order to add a second OLT to be used for the WDM-PON within the CO or within another CO which is located in a position different from the CO, while sharing the SMF; positioning a second apparatus for combining and splitting wavelength bands at a front terminal of the splitter; and installing additionally an arrayed waveguide grating (AWG) within the RN or within another RN which is located in a position different from the RN, wherein the AWG is connected to the second apparatus for combining and splitting wavelength bands which is located within the RN and is connected to a second group of one or more ONTs by a second group of one or more distribution fibers, and wherein a third apparatus for combining and splitting wavelength bands having a first port, a second port, and a third port and a fourth apparatus for combining and splitting wavelength bands having a fourth port, a fifth port, and a sixth port are provided at a back terminal of the splitter, while the third apparatus for combining and splitting wavelength bands is positioned within the RN and the fourth apparatus for combining and splitting wavelength bands is positioned within the first group of one or more ONTs, and wherein the first port is connected to the splitter, the second port is connected to the fifth port through any one of the first group of one or more distribution fibers, the third port is connected to the AWG, the fourth port is connected to any one ONT of the first group of one or more ONTs, and the sixth port is connected to any one ONT of the second group of one or more ONTs.

According to fourth aspect of the present invention, the present invention provides a method for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises: a central office (CO) having a first optical line termination (OLT); a remote node (RN) having a splitter; a single mode fiber (SMF) connecting the first OLT and the splitter; and a first group of one or more optical network terminations (ONTs) being connected to the splitter by a first group of one or more distribution fibers, and wherein the method for upgrading comprises: in case that the next-generation PON is a WDM-PON, positioning a first apparatus for combining and splitting wavelength bands between the SMF and the first OLT, in order to add a second OLT to be used for the WDM-PON within the CO or within another CO which is located in a position different from the CO, while sharing the SMF; positioning a second apparatus for combining and splitting wavelength bands having a first port, a second port, and a third port and a third apparatus for combining and splitting wavelength bands having a fourth port, a fifth port, and a sixth port in parallel at a front terminal of the splitter; positioning a first arrayed waveguide grating (AWG) between the second apparatus for combining and splitting wavelength bands and a newly added second group of one or more ONTs to be connected by a second group of one or more distribution fibers; and positioning a second AWG between the third apparatus for combining and splitting wavelength bands and a newly added third group of one or more ONTs to be connected by a third group of one or more distribution fibers, and wherein the first port is connected to any one ONT of the first group of one or more ONTs through the first group of one or more distribution fibers, the second port is connected to the splitter, and the third port is connected to the first AWG, wherein the fourth port is connected to another ONT of the first group of one or more ONTs through the first group of one or more distribution fibers, the fifth port is connected to the splitter, and the sixth port is connected to the second AWG, and wherein the first AWG and the second AWG are respectively positioned within the RN or within another RN which is located in a position different from the RN.

According to fifth aspect of the present invention, the present invention provides a network architecture for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises: a central office (CO) having a first optical line termination (OLT); a remote node (RN) having a splitter; a single mode fiber (SMF) connecting the first OLT and the splitter; and a first group of one or more optical network terminations (ONTs) being connected to the splitter by a first group of one or more distribution fibers, and wherein the network architecture further comprises: in case that the next-generation PON is a WDM-PON, a first apparatus for combining and splitting wavelength bands being positioned between the SMF and the first OLT, in order to add a second OLT to be used for the WDM-PON within the CO or within another CO which is located in a position different from the CO, while sharing the SMF; a second apparatus for combining and splitting wavelength bands being positioned at a front terminal of the splitter; and an arrayed waveguide grating (AWG) being connected to the second apparatus for combining and splitting wavelength bands within the RN, and being connected to a second group of one or more ONTs by a second group of one or more distribution fibers within the RN or within another RN which is located in a position different from the RN.

According to sixth aspect of the present invention, the present invention provides a network architecture for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises: a central office (CO) having a first optical line termination (OLT); a remote node (RN) having a splitter; a single mode fiber (SMF) connecting the first OLT and the splitter; and a first group of one or more optical network terminations (ONTs) being connected to the splitter by a first group of one or more distribution fibers, and wherein the network architecture further comprises: in case that the next-generation PON is a WDM-PON, a first apparatus for combining and splitting wavelength bands being positioned between the SMF and the first OLT, in order to add a second OLT to be used for the WDM-PON within the CO or within another CO which is located in a position different from the CO, while sharing the SMF; a second apparatus for combining and splitting wavelength bands being positioned at a front terminal of the splitter; and an arrayed waveguide grating (AWG) being connected to the second apparatus for combining and splitting wavelength bands which is located within the RN, being installed additionally within the RN or within another RN which is located in a position different from the RN, and being connected to a second group of one or more ONTs by a second group of one or more distribution fibers, and wherein any one distribution fiber among the first group of one or more distribution fibers is connected to the AWG, instead of being connected to the splitter.

According to seventh aspect of the present invention, the present invention provides a network architecture for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises: a central office (CO) having a first optical line termination (OLT); a remote node (RN) having a splitter; a single mode fiber (SMF) connecting the first OLT and the splitter; and a first group of one or more optical network terminations (ONTs) being connected to the splitter by a first group of one or more distribution fibers, and wherein the network architecture further comprises: in case that the next-generation PON is a WDM-PON, a first apparatus for combining and splitting wavelength bands being positioned between the SMF and the first OLT, in order to add a second OLT to be used for the WDM-PON within the CO or within another CO which is located in a position different from the CO, while sharing the SMF; a second apparatus for combining and splitting wavelength bands being positioned at a front terminal of the splitter; an arrayed waveguide grating (AWG) being connected to the second apparatus for combining and splitting wavelength bands which is located within the RN, being installed within the RN or within another RN which is located in a position different from the RN, and being connected to a second group of one or more ONTs by a second group of one or more distribution fibers; a third apparatus for combining and splitting wavelength bands having a first port, a second port, and a third port, which is positioned within the RN and is provided at a back terminal of the splitter; and a fourth apparatus for combining and splitting wavelength bands having a fourth port, a fifth port, and a sixth port, which is positioned within the first group of one or more ONTs and is connected to any one ONT of the first group of one or more ONTs, and wherein the first port is connected to the splitter, the second port is connected to the fifth port through any one of the first group of one or more distribution fibers, the third port is connected to the AWG, the fourth port is connected to any one ONT of the first group of one or more ONTs, and the sixth port is connected to any one ONT of the second group of one or more ONTs.

According to eighth aspect of the present invention, the present invention provides a network architecture for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises: a central office (CO) having a first optical line termination (OLT); a remote node (RN) having a splitter; a single mode fiber (SMF) connecting the first OLT and the splitter; and a first group of one or more optical network terminations (ONTs) being connected to the splitter by a first group of one or more distribution fibers, and wherein the network architecture further comprises: in case that the next-generation PON is a WDM-PON, a first apparatus for combining and splitting wavelength bands being positioned between the SMF and the first OLT, in order to add a second OLT to be used for the WDM-PON within the CO or within another CO which is located in a position different from the CO, while sharing the SMF; a second apparatus for combining and splitting wavelength bands having a first port, a second port, and a third port, being connected to a back terminal of the splitter; a third apparatus for combining and splitting wavelength bands having a fourth port, a fifth port, and a sixth port, being connected, in parallel, to the second apparatus for combining and splitting wavelength bands at a back terminal of the splitter; a first arrayed waveguide grating (AWG) being connected to the second apparatus for combining and splitting wavelength bands and being connected to a newly added second group of one or more ONTs by a second group of one or more distribution fibers; and a second AWG being connected to the third apparatus for combining and splitting wavelength bands and being connected to a newly added third group of one or more ONTs by a third group of one or more distribution fibers, and wherein the first AWG and the second AWG are respectively provided within the RN or within another RN which is located in a position different from the RN, wherein the first port is connected to any one ONT of the first group of one or more ONTs through the first group of one or more distribution fibers, the second port is connected to the splitter, and the third port is connected to the first AWG, and wherein the fourth port is connected to another ONT of the first group of one or more ONTs through the first group of one or more distribution fibers, the fifth port is connected to the splitter, and the sixth port is connected to the second AWG.

According to ninth aspect of the present invention, the present invention provides a network architecture for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises: a central office (CO) having a first optical line termination (OLT); a remote node (RN) having an splitter; a single mode fiber (SMF) connecting the first OLT and the splitter; and a first group of one or more optical network terminations (ONTs) being connected to the splitter by a first group of one or more distribution fibers, and wherein the next-generation PON is a WDM-PON, and wherein the network architecture further comprises: a first apparatus for combining and splitting wavelength bands being positioned between the SMF and the first OLT, in order to add a second OLT to be used for the WDM-PON within the CO or within another CO which is located in a position different from the CO, while sharing the SMF; the second OLT, being connected to the first apparatus for combining and splitting wavelength bands within the CO or within another CO which is located in a position different from the CO, comprised of a plurality of first optical transceivers for transmitting downstream signals of the WDM-PON and receiving upstream signals thereof; a plurality of first C/L WDM filters, being connected to the plurality of first optical transceivers, respectively, for splitting wavelength bands of the transmitted and received signals; a first arrayed waveguide grating (AWG), being connected to the plurality of first C/L WDM filters, for multiplexing and de-multiplexing the transmitted and received signals; and a broadband light source (BLS) with C-band and L-band, being connected to the first AWG, for providing wavelength-locked F-P LDs; a second apparatus for combining and splitting wavelength band, being positioned at a front terminal of the splitter; a second AWG, being connected to the second apparatus for combining and splitting wavelength bands and being positioned with the RN or within another RN which is located in a position different from the RN, for multiplexing and de-multiplexing the transmitted and received signals; a second group of one or more ONTs comprised of a plurality of second optical transceivers for transmitting downstream signals of the WDM-PON and receiving upstream signals thereof; and a plurality of second C/L WDM filters, being connected to the plurality of second optical transceivers, respectively through second AWG and a group of one or more distribution fibers, for splitting wavelength bands of the transmitted and received signals; a third apparatus for combining and splitting wavelength bands having a first port, a second port, and a third port, being connected to a back terminal of the splitter; and a fourth apparatus for combining and splitting wavelength bands having a fourth port, a fifth port, and a sixth port, being connected to the third apparatus for combining and splitting wavelength band, wherein the third apparatus for combining and splitting wavelength bands is provided within the RN, while the fourth apparatus for combining and splitting wavelength bands is provided within the first group of one or more ONTs, wherein the first port is connected to the splitter, wherein the second port is connected to the fifth port by any one of the first group of one or more distribution fibers, wherein the third port is connected to the second AWG, wherein the fourth port is connected to any one ONT of the first group of one or more ONTs, and wherein the sixth port is connected to any one ONT of the second group of one or more ONTs.

The inventors considered a WDM-PON as a next generation access network. However, the scheme proposed in the present invention can be also applied to any kind of next generation PON that uses wavelength division AWG (multiplexer/de-multiplexer) as an optical branching device. Since the AWG has a less insertion loss compared with an optical power splitter used for a TDM-PON, it is possible to add optical power splitters at an output port of the AWG to have more subscribers. The split ratio of an optical power splitter to be added will depend on a power budget of an optical link.

Further features and advantages of the present invention can be fully understandable with reference to the accompanying drawings where same or similar reference numerals indicate same components.

ADVANTAGEOUS EFFECTS

A method and a network architecture for upgrading a legacy PON to a next-generation PON according to the present invention have following advantages:

1. The present invention is possible to provide broadband services through an increase of the number of subscribers and an expansion of bandwidth, simultaneously with maintaining a TDM-based access network which is currently used, while using an already installed optical fiber.

2. The present invention can solve the problems of a prior art optical network at a low cost, because it is possible to upgrade a PON by using a simple-typed, one kind of an apparatus for combining and splitting wavelength band.

BRIEF DESCRIPTION OF THE DRAWINGS

FIG. 1 illustrates an apparatus for combining and splitting wavelength bands which is used for upgrading a TDM-PON to a next-generation PON.

FIG. 2 illustrates a first embodiment of a method and a network architecture for upgrading a legacy PON to a next-generation PON.

FIG. 3 illustrates a second embodiment of a method and a network architecture for upgrading a legacy PON to a next-generation PON.

FIG. 4 illustrates a third embodiment of a method and a network architecture for upgrading a legacy PON to a next-generation PON.

FIG. 5 illustrates an experimental network architecture for upgrading a legacy PON to a next-generation PON.

FIG. 6 illustrates an upstream optical spectrum measured from an experimental network architecture illustrated in FIG. 5.

FIG. 7 illustrates a downstream optical spectrum measured from an experimental network architecture illustrated in FIG. 5.

FIG. 8 illustrates a packet loss rate in a WDM-PON upstream signal measured from an experimental network architecture illustrated in FIG. 5.

FIG. 9 illustrates a BER (bit error rate) in a TDM-PON upstream signal measured from an experimental network architecture illustrated in FIG. 5.

FIG. 10 illustrates a BER in a TDM-PON downstream signal measured from an experimental network architecture illustrated in FIG. 5.

FIG. 11 illustrates a packet loss rate in upstream and downstream signals at Tx9 of a WDM-PON measured from an experimental network architecture illustrated in FIG. 5.

MODE FOR THE INVENTION

Hereinafter, structures and functions of preferred embodiments in accordance with the present invention are described in more detail with reference to the appended drawings.

It is required to increase of the number of subscribers or to provide a higher bandwidth by installing a new network additionally while using a currently used optical fiber and a currently used splitter, in order to upgrade a legacy TDM-PON based PON to a next-generation PON.

FIG. 1 illustrates an apparatus for combining and splitting wavelength bands which is used for upgrading a TDM-PON to a next-generation PON.

Referring to FIG. 1, a method and a network architecture for upgrading a legacy passive optical network to a next-generation PON according to the present invention employs an apparatus for combining and splitting wavelength bands having three input and output ports as illustrated in FIG. 1, which inputs or splits signals having wavelength bands being used in a next-generation PON simultaneously with passing upstream and downstream signals, in order to use an existing optical fiber installed for being used in a legacy TDM-PON. An apparatus for combining and splitting wavelength bands having three input and output ports as illustrated in FIG. 1 is described in detail in a Korean patent application No. 10-2006-0106159 (hereinafter refereed to "'159 Application") filed by the applicant of this application, on Oct. 31, 2006, entitled "Apparatus for combining and splitting wavelength band Having Three Input and Output Ports." The disclosure of '159 Application is incorporated herein by reference.

More specifically, an apparatus for combining and splitting wavelength bands illustrated in FIG. 1 and employed by a network architecture for upgrading a legacy passive optical network to a next-generation PON is directed to one example which may be applied to a case of upgrading an optical network by adopting a WDM-PON as a next-generation PON. In an apparatus for combining and splitting wavelength bands illustrated in FIG. 1, although it is described that a band having a range of 1480~1500 nm is used as downstream signals, while a band having a range of 1260~1360 nm is used as upstream signals, where both bands having ranges of 1480~1500 nm and 1260~1360 nm are respectively a standard wavelength band defined by Full Service Access Network (FSAN) to be used for a legacy TDM-PON, the scope of the present invention is not limited to both bands. An apparatus for combining and splitting wavelength bands illustrated in FIG. 1 performs a function of combining and splitting signals of a next-generation PON which are newly added in a next-generation, and is comprised of two edge filters (a first edge filter and a second edge filter) and a coarse wavelength division multiplexing (CWDM) filter. A common port (C) of the first edge filter is connected to OLT of a legacy TDM-PON, and a common port (C) of the second edge filter is connected to RN. A common port (C) of the CWDM filter is connected to OLT of a next-generation PON. Thus, signals of the legacy TDM-PON are inputted in or outputted from at port number 1, signals of the next-generation PON are inputted in or outputted from at port number 3, and signals of both the legacy TDM-PON and the next-generation PON are inputted in or outputted from at port number 2. In this case, downstream signals of the legacy TDM-PON having 1490 nm, being inputted into port number 1 illustrated in FIG. 1, are transmitted along a path ①. Upstream signals of the legacy TDM-PON having 1310 nm are transmitted along a path ②. Further, signals of a next-generation PON may be selected from a band having a range of 1420~1470 nm or a band having a range of 1510 nm or more and are transmitted along a path ③. Accordingly, It is easy to upgrade a legacy TDM-POM by combining signals of a next-generation PON with a legacy access network and splitting signals of a next-generation PON from a legacy access network, if an apparatus for combining and splitting wavelength bands illustrated in FIG. 1 is added in CO and RN at a legacy-running TDM-PON based optical network.

FIG. 2 illustrates a first embodiment of a method and a network architecture for upgrading a legacy PON to a next-generation PON.

Referring to FIG. 2, if a first apparatus for combining and splitting wavelength bands such as one illustrated in FIG. 1 is positioned between an existing single mode fiber (SMF) (20 km) and an existing OLT at CO, as illustrated in FIG. 2, in order to upgrade a legacy TDM-PON to a next-generation PON, it is possible to add a new OLT (i.e., a next-generation OLT) while sharing the existing SMF (20 km). Further, it is possible to add a second apparatus for combining and splitting wavelength bands such as one illustrated in FIG. 1 at a front terminal of a splitter located in RN, and the second apparatus for combining and splitting wavelength bands splits the signals of the next-generation PON transmitted through the SMF (20 km) from the signals of the legacy TDM-PON.

In an embodiment illustrated in FIG. 2, an arrayed waveguide grating (AWG) is additionally installed, as a first wavelength division multiplexing (WDM) filter, in RN, when the next-generation PON is a WDM-PON. Here, the position of the additionally installed AWG may be the same as or different from the position of the splitter. That is, the AWG may be positioned within the existing RN illustrated in FIG. 2 or may be positioned within another RN (not shown) different from the existing RN. However, even in case of installing additionally another PON which is the same kind as the legacy PON (ATM-PON, B-PON, E-PON, G-PON), the additionally installed PON may be considered to be a next-generation PON which uses a new wavelength band. Moreover, the position of OLT to be used for a next-generation PON for upgrading to the next-generation PON may be different from the position of OLT of the legacy TDM-PON located at CO. That is, OLT to be used for the next-generation PON may be positioned within the existing CO or may be positioned within another CO different from the existing CO.

FIG. 3 illustrates a second embodiment of a method and a network architecture for upgrading a legacy PON to a next-generation PON, and FIG. 4 illustrates a third embodiment of a method and a network architecture for upgrading a legacy PON to a next-generation PON.

Referring to FIG. 3, in case that a subscriber of a legacy TDM-PON wants services of a next-generation PON, it is possible to meet the subscribers demand by installing AWG additionally while using an existing distribution fiber like an example of ONT 16 illustrated in FIG. 3 and thus by switching ONT of a legacy PON to ONT of a new next-generation PON. In this case, the subscribers (ONT 1 and ONT 32 indicated in a solid line) of the legacy TDM-PON are provided with services through the legacy TDM-PON. If there exist additional subscribers of the legacy TDM-PON wanting the services of the next-generation PON, it is possible to provide the services of the next-generation PON with them sequentially, like ONT 16. By doing so, it is possible to switch the subscribers of the legacy TDM-PON to the subscribers capable of being provided with the services of the next-generation PON in a step-by-step manner, at any time when the subscribers of the legacy TDM-PON want. Further, in case that the subscriber (ONT 32 indicated in a solid line) of the legacy TDM-PON want the services of the legacy TDM-PON and the services of the next-generation PON simultaneously, it is possible to provide such required services by additionally using a third apparatus for combining and splitting wavelength bands and a fourth apparatus for combining and splitting wavelength band. In this case, the third apparatus for combining and splitting wavelength bands is positioned in RN, while the fourth apparatus for combining and splitting wavelength bands is positioned at ONT side. A first port of the third apparatus for combining and splitting wavelength bands is connected to an existing splitter (indicated in a solid line), a second port thereof is connected to a distribution fiber of the legacy TDM-PON, and a third port thereof is connected to an AWG (indicated in a dot line). Meanwhile, a first port of the fourth apparatus for combining and splitting wavelength bands is connected to an existing ONT 32 (indicated in solid lines), a second port thereof is connected to the distribution fiber of the legacy TDM-PON, and a third port thereof is connected to the additional ONT 32 (indicated in a dot line).

In a second embodiment illustrated in FIG. 3, in case that the next-generation PON is especially a WDM-PON and has an enough link margin, the second embodiment illustrated in FIG. 3 may be applied to a third embodiment corresponding to a network architecture illustrated in FIG. 4.

Referring to FIG. 4, a second apparatus for combining and splitting wavelength bands and a third apparatus for combining and splitting wavelength bands are connected, in parallel, to a back terminal of a splitter existing in RN. The second apparatus for combining and splitting wavelength bands and the third apparatus for combining and splitting wavelength bands split signals of the next-generation PON which are transmitted through SMF (20 km), and the split signals of the next-generation PON are respectively de-multiplexed/multiplexed by a first AWG and a second AWG and thus can provide services to new subscribers (ONT1 and ONT32 indicated in a dot line). Herein, OLT and ONT of the WDM-PON, which is a next-generation PON, must have a TDMA function. In this case, an optical amplifier (not shown) may be used between the second apparatus for combining and splitting wavelength bands and the first AWG and/or between the third apparatus for combining and splitting wavelength bands and the second AWG, in order to compensate for losses of the splitter and SMF, etc.

FIG. 5 illustrates an experimental network architecture for upgrading a legacy PON to a next-generation PON.

Referring to FIG. 5, a network architecture according to the present invention adopts a WDM-PON as a next-generation PON. In a TDM-PON being used in the embodiment in FIG. 5, a distributed feedback (DFB) laser or a Fabry-Perot laser diode (F-P LD) having 1310 nm band may be used as an upstream optical source, and a DFB laser or an F-P LD having 1490 nm band may be used as a downstream optical source. Further, each of the wavelength bands to be used for the upstream optical source and the downstream optical source may be selected from anyone among E-band, S-band, C-band, and L-band, while anyone among a DFB laser, a wavelength-locked F-P LD (See H. D. Kim, S. G. Kang, and C. H. Lee, A low-cost WDM source with an ASE injected Fabry-Perot semiconductor laser, *IEEE Photon, Technol. Lett.*, vol. 12, no. 8, pp. 1067-1069, August 2000), a wavelength-seeded reflective semiconductor optical amplifier (RSOA), and wavelength tunable laser may be used as a optical source for a WDM-PON.

More specifically, the network architecture according to an embodiment in FIG. 5 has used a DFB laser having 1310 nm band and 1490 nm band, respectively, as an upstream and a down stream optical sources of the TDM-PON, while having used an F-P LD which is wavelength-locked to C-band and L-band as an upstream and a down stream optical sources of the WDM-PON. Particularly, it is assumed that ONT9 of the WDM-PON is provided with serviced from the legacy TDM-PON and the newly added WDM-PON. In this case, OLT optical source (1490 nm) of the legacy TDM-PON passes a first apparatus for combining and splitting wavelength band, is transmitted through SMF (20 km), and then is inputted into a splitter through a second apparatus for combining and splitting wavelength band. The light split depending on a split ratio of the splitter is transmitted to ONT for the TDM-PON. An upstream signal having 1310 nm of the TDM-PON is transmitted in a reverse direction to the direction of a downstream signal described above. OLT of the WDM-PON, which is newly added within CO, is comprised of optical transceivers (Tx1/Rx1, . . . , Tx32/Rx32) for transmitting downstream signals of the WDM-PON and receiving upstream signals thereof, C/L WDM filters for splitting wavelength bands of the transmitted and received signals, a first AWG (AWG1) for multiplexing and de-multiplexing the transmitted and received signals, and a broadband light source (BLS) with C-band and L-band for providing a wavelength-locked F-P LD. Multiplexed signals through the first AWG are inputted through the first apparatus for combining and splitting wavelength band, and then are added to the legacy TDM-PON and are transmitted along with the signals of the TDM-PON through SMF (20 km). After that, the signals of the WDM-PON are split from the signals of the TDM-PON by the second apparatus for combining and splitting wavelength band, are de-multiplexed through the second AWG (AWG2), and are transmitted to ONT for the WDM-PON after passing the distribution/drop fibers. ONT is also comprised of optical transceivers (Tx1/Rx1, . . . , Tx32/Rx32) for transmitting the downstream signals and receiving the upstream signals, and C/L WDM filters for splitting the wavelength bands of the transmitted and received signals.

FIG. 6 illustrates an upstream optical spectrum measured from an experimental network architecture illustrated in FIG. 5, FIG. 7 illustrates a downstream optical spectrum measured from an experimental network architecture illustrated in FIG. 5, FIG. 8 illustrates a packet loss rate of a WDM-PON upstream signal measured from an experimental network architecture illustrated in FIG. 5, and FIG. 9 illustrates a BER (bit error rate) in a TDM-PON upstream signal measured from an experimental network architecture illustrated in FIG. 5.

More specifically, FIG. 6 illustrates upstream optical spectra of a TDM-PON and a WDM-PON measured at SMF (20 km) of FIG. 5, while FIG. 7 illustrates downstream optical spectra of a TDM-PON and a WDM-PON measured at SMF (20 km) of FIG. 5. Further, FIG. 8 illustrates a packet loss rate measured from upstream signals of newly added WDM-PON. In case of referring to FIG. 9, there is almost no difference in a BER (bit error rate) when comparing transmission results of the upstream signals of TDM-PON with 1.25 Gb/s, which are measured before and after adding the WDM-PON and therefore it is recognizable that a power penalty caused by the addition of the WDM-PON may be negligible.

FIG. 10 illustrates BER in a TDM-PON downstream signal measured from an experimental network architecture illustrated in FIG. 5, and FIG. 11 illustrates a packet loss rate in upstream and downstream signals at ONT9 of a WDM-PON measured from an experimental network architecture illustrated in FIG. 5.

Referring to FIG. 10, there is almost no difference in a BER when comparing transmission results of the downstream signals of TDM-PON with 1.25 Gb/s, which are measured before and after adding the WDM-PON, similarly to FIG. 9, and therefore it is recognizable that a power penalty caused by the addition of the WDM-PON may be negligible. Further, referring to FIG. 11, there is almost no difference between a packet loss rate of a WDM downstream signal measured at ONT 9 (Rx9 at ONT side) of a WDM-PON and a packet loss rate of a WDM upstream signal measured at (Rx9 at CO side), depending on the existence and non-existence of a legacy TDM-PON, and therefore it is recognizable that a power penalty caused by the existence and non-existence of a TDM-PON may be negligible.

Although a burst mode receiver is not used as an upstream receiver in an embodiment of the present invention illustrated in FIG. 5, the apparatus for combining and splitting wavelength bands used in the present invention has a highly-qualified function of splitting the signals of the legacy TDM-PON and the signals of the next-generation PON (an isolation) of 70 dB or more is desirable and an isolation of the apparatus for combining and splitting wavelength bands used in the present invention is 100 dB or more) so that it is possible to use a burst mode receiver.

Accordingly, it is possible to accomplish upgrading to a next-generation PON by providing a method and a network architecture for upgrading a legacy TDM-PON to a next-generation PON effectively by using a simple-typed apparatus for combining and splitting wavelength band.

INDUSTRIAL APPLICABILITY

A method and a network architecture for upgrading a legacy PON to a next-generation PON according to the present invention has following advantages:

1. The present invention is possible to provide broadband services through an increase of subscribers and an expansion of bandwidth, simultaneously with maintaining a TDM-based PON which is currently used, while using an already installed optical fiber.

2. The present invention can solve the problems of a prior art optical network at a low cost, because it is possible to upgrade a PON by using a simple-typed, one kind of an apparatus for combining and splitting wavelength band.

As various modifications could be made in the constructions and method herein described and illustrated without departing from the scope of the present invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A method for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises:
a central office (CO) having a first optical line termination (OLT);
a remote node (RN) having a splitter;
a single mode fiber (SMF) connecting the first OLT and the splitter; and
a first group of one or more optical network terminations (ONTs) being connected to the splitter by a first group of one or more distribution fibers, and wherein the method for upgrading comprises:
in case that the next-generation PON is a WDM-PON, positioning a first apparatus for combining and splitting wavelength bands between the SMF and the first OLT, in order to add a second OLT to be used for the WDM-PON within the CO or within another CO which is located in a position different from the CO, while sharing the SMF;
positioning a second apparatus for combining and splitting wavelength bands at a front terminal of the splitter; and
installing additionally an arrayed waveguide grating (AWG) within the RN or within another RN which is located in a position different from the RN, wherein the AWG is connected to the second apparatus for combining and splitting wavelength bands and is connected to a second group of one or more ONTs by a second group of one or more distribution fibers.

2. The method for upgrading a legacy TDM-PON to a WDM-PON based next-generation PON of claim 1, wherein the first apparatus for combining and splitting wavelength bands is comprised of a first edge filter, a second edge filter, and a first coarse wavelength division multiplexing (CWDM) filter, wherein the second apparatus for combining and splitting wavelength bands is comprised of a third edge filter, a fourth edge filter, and a second CWDM filter, and wherein the first apparatus for combining and splitting wavelength bands and the second apparatus for combining and splitting wavelength bands perform a function of combining and splitting signals of the legacy TDM-PON and signals of the WDM-PON, respectively.

3. A method for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises:
a central office (CO) having a first optical line termination (OLT);
a remote node (RN) having a splitter;
a single mode fiber (SMF) connecting the first OLT and the splitter; and
a first group of one or more optical network terminations (ONTs) being connected to the splitter by a first group of one or more distribution fibers, and wherein the method for upgrading comprises:
in case that the next-generation PON is a WDM-PON, positioning a first apparatus for combining and splitting wavelength bands between the SMF and the first our, in order to add a second OLT to be used for the WDM-PON within the CO or within another CO which is located in a position different from the CO, while sharing the SMF;
positioning a second apparatus for combining and splitting wavelength bands at a front terminal of the splitter; and
installing additionally an arrayed waveguide grating (AWG) within the RN or within another RN which is located in a position different from the RN, wherein the AWG is connected to the second apparatus for combining and splitting wavelength bands which is located within the RN and is connected to a second group of one or more ONTs by a second group of one or more distribution fibers, and wherein any one distribution fiber of the first group of one or more distribution fibers, which is connected to any one ONT of the first group of one or more ONTs, is connected to the AWG, instead of being connected to the splitter.

4. The method for upgrading a legacy TDM-PON to a WDM-PON based next-generation PON of claim 3, wherein the first apparatus for combining and splitting wavelength bands is comprised of a first edge filter, a second edge filter, and a first coarse wavelength division multiplexing (CWDM) filter, wherein the second apparatus for combining and splitting wavelength bands is comprised of a third edge filter, a fourth edge filter, and a second CWDM filter, and wherein the first apparatus for combining and splitting wavelength bands and the second apparatus for combining and splitting wavelength bands perform a function of combining and splitting signals of the legacy TDM-PON and signals of the WDM-PON, respectively.

5. A method for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises:
a central office (CO) having a first optical line termination (OLT);
a remote node (RN) having a splitter;
a single mode fiber (SMF) connecting the first OLT and the splitter; and
a first group of one or more optical network terminations (ONTs) being connected to the splitter by a first group of one or more distribution fibers, and wherein the method for upgrading comprises:
in case that the next-generation PON is a WDM-PON, positioning a first apparatus for combining and splitting wavelength bands between the SMF and the first OLT, in order to add a second OLT to be used for the WDM-PON within the CO or within another CO which is located in a position different from the CO, while sharing the SMF;
positioning a second apparatus for combining and splitting wavelength bands at a front terminal of the splitter; and
installing additionally an arrayed waveguide grating (AWG) within the RN or within another RN which is located in a position different from the RN, wherein the AWG is connected to the second apparatus for combining and splitting wavelength bands which is located within the RN and is connected to a second group of one or more ONTs by a second group of one or more distribution fibers, and wherein a third apparatus for combining and splitting wavelength bands having a first port, a second port, and a third port and a fourth apparatus for combining and splitting wavelength bands having a fourth port, a fifth port, and a sixth port are provided at a back terminal of the splitter, while the third apparatus for combining and splitting wavelength bands is positioned within the RN and the fourth apparatus for combining and splitting wavelength bands is positioned within the first group of one or more ONTs, and wherein the first port is connected to the splitter, the second port is connected to the fifth port through any one of the first group of one or more distribution fibers, the third port is connected to the AWG, the fourth port is connected to any one ONT of the first group of one or more ONTs, and the sixth port is connected to any one ONT of the second group of one or more ONTs.

6. The method for upgrading a legacy TDM-PON to a WDM-PON based next-generation PON of claim 5, wherein the first apparatus for combining and splitting wavelength bands is comprised of a first edge filter, a second edge filter, and a first coarse wavelength division multiplexing (CWDM) filter, wherein the second apparatus for combining and splitting wavelength bands is comprised of a third edge filter, a fourth edge filter, and a second CWDM filter, wherein the third apparatus for combining and splitting wavelength bands is comprised of a fifth edge filter, a sixth edge filter, and a third CWDM filter, wherein the fourth apparatus for combining and splitting wavelength bands is comprised of a seventh edge filter, an eighth edge filter, and a fourth CWDM filter, and wherein the first apparatus for combining and splitting wavelength band, the second apparatus for combining and splitting wavelength band, the third apparatus for combining and splitting wavelength band, and the fourth apparatus for combining and splitting wavelength bands perform a function of combining and splitting signals of the legacy TDM-PON and signals of the WDM-PON, respectively.

7. A method for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises:
a central office (CO) having a first optical line termination (OLT);
a remote node (RN) having a splitter;
a single mode fiber (SMF) connecting the first OLT and the splitter; and
a first group of one or more optical network terminations ((ONTs) being connected to the splitter by a first group of one or more distribution fibers, and wherein the method for upgrading comprises:
in case that the next-generation PON is a WDM-PON, positioning a first apparatus for combining and splitting wavelength bands between the SMF and the first OLT, in order to add a second OLT to be used for the WDM-PON within the CO or within another CO which is located in a position different from the CO, while sharing the SMF;
positioning a second apparatus for combining and splitting wavelength bands having a first port, a second port, and a third port and a third apparatus for combining and splitting wavelength bands having a fourth port, a fifth port, and a sixth port in parallel at a front terminal of the splitter;
positioning a first arrayed waveguide grating (AWG) between the second apparatus for combining and splitting wavelength bands and a newly added second group of one or more ONTs to be connected by a second group of one or more distribution fibers; and
positioning a second AWG between the third apparatus for combining and splitting wavelength bands and a newly added third group of one or more ONTs to be connected by a third group of one or more distribution fibers, and wherein the first port is connected to any one ONT of the first group of one or more ONTs through the first group of one or more distribution fibers, the second port is connected to the splitter, and the third port is connected to the first AWG, wherein the fourth port is connected to another ONT of the first group of one or more ONTs through the first group of one or more distribution fibers, the fifth port is connected to the splitter, and the sixth port is connected to the second AWG, and wherein the first AWG and the second AWG are respectively positioned within the RN or within another RN which is located in a position different from the RN.

8. The method for upgrading a legacy TDM-PON to a WDM-PON based next-generation PON of claim 7, wherein all of the second OLT of the WDM-PON, the second group of one or more ONTs, and the third group of one or more ONTs have a time division multiple access (TDMA) function.

9. The method for upgrading a legacy TDM-PON to a WDM-PON based next-generation PON of claim 7, wherein the first apparatus for combining and splitting wavelength bands is comprised of a first edge filter, a second edge filter, and a first coarse wavelength division multiplexing (CWDM) filter, wherein the second apparatus for combining and splitting wavelength bands is comprised of a third edge filter, a fourth edge filter, and a second CWDM filter, wherein the third apparatus for combining and splitting wavelength bands is comprised of a fifth edge filter, a sixth edge filter, and a third CWDM and wherein the first apparatus for combining and splitting wavelength band, the second apparatus for combining and splitting wavelength band, and the third apparatus for combining and splitting wavelength bands perform a function of combining and splitting signals of the legacy TDM-PON and signals of the WDM-PON, respectively.

10. The method for upgrading a legacy TDM-PON to a WDM-PON based next-generation PON of claim 7, wherein a certain optical amplifier is provided between the second apparatus for combining and splitting wavelength bands and the first AWG and/or between the third apparatus for combining and splitting wavelength bands and the second AWG.

11. A network architecture for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises:
a central office (CO) having a first optical line termination (OLT);
a remote node (RN) having a splitter;
a single mode fiber (SMF) connecting the first OLT and the splitter; and
a first group of one or more optical network terminations (ONTs) being connected to the splitter by a first group of one or more distribution fibers, and wherein the network architecture further comprises:
in case that the next-generation PON is a WDM-PON, a first apparatus for combining and splitting wavelength bands being positioned between the SMF and the first OLT, wavelength in order to add a second OLT to be used for the WDM-PON within the CO or within another CO which is located in a position different from the CO, while sharing the SMF;
a second apparatus for combining and splitting wavelength bands being positioned at a front terminal of the splitter; and
an arrayed waveguide grating (AWG) being connected to the second apparatus for combining and splitting wavelength bands within the RN, and being connected to a second group of one or more ONTs by a second group of one or more distribution fibers within the RN or within another RN which is located in a position different from the RN.

12. The network architecture for upgrading a legacy TDM-PON to a WDM-PON based next-generation PON of claim 11, wherein the first apparatus for combining and splitting wavelength bands is comprised of a first edge filter, a second edge filter, and a first coarse wavelength division multiplexing (CWDM) filter, wherein the second apparatus for combining and splitting wavelength bands is comprised of a third edge filter, a fourth edge filter, and a second CWDM filter, and wherein the first apparatus for combining and splitting wavelength bands and the second apparatus for combining and splitting wavelength bands perform a function of combining and splitting signals of the legacy TDM-PON and signals of the WDM-PON, respectively.

13. A network architecture for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises:
a central office (CO) having a first optical line termination (OLT);
a remote node (RN) having a splitter;
a single mode fiber (SMF) connecting the first OLT and the splitter; and
a first group of one or more optical network terminations (ONTs) being connected to the splitter by a first group of one or more distribution fibers, and wherein the network architecture further comprises:
in case that the next-generation PON is a WDM-PON, a first apparatus for combining and splitting wavelength bands being positioned between the SMF and the first OLT, in order to add a second OLT to be used for the WDM-PON within the CO or within another CO which is located in a position different from the CO, while sharing the SMF;
a second apparatus for combining and splitting wavelength bands being positioned at a front terminal of the splitter; and
an arrayed waveguide grating (AWG) being connected to the second apparatus for combining and splitting wavelength bands which is located within the RN, being installed additionally within the RN or within another RN which is located in a position different from the RN, and being connected to a second group of one or more ONTs by a second group of one or more distribution fibers, and wherein any one distribution fiber among the first group of one or more distribution fibers is connected to the AWG, instead of being connected to the splitter.

14. The network architecture for upgrading a legacy TDM-PON to a WDM-PON based next-generation PON of claim 13, wherein the first apparatus for combining and splitting wavelength bands is comprised of a first edge filter, a second edge filter, and a first coarse wavelength division multiplexing (CWDM) filter, wherein the second apparatus for combining and splitting wavelength bands is comprised of a third edge filter, a fourth edge filter, and a second CWDM filter, and wherein the first apparatus for combining and splitting wavelength bands and the second apparatus for combining and splitting wavelength bands perform a function of combining and splitting signals of the legacy TDM-PON and signals of the WDM-PON, respectively.

15. A network architecture for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises:
a central office (CO) having a first optical line termination (OLT);
a remote node (RN) having a splitter;
a single mode fiber (SMF) connecting the first OLT and the splitter; and a first group of one or more optical network terminations (ONTs) being connected to the splitter by a first group of one or more distribution fibers, and wherein the network architecture further comprises:

in case that the next-generation PON is a WDM-PON, a first apparatus for combining and splitting wavelength bands being positioned between the SMF and the first in order to add a second OLT to be used for the WDM-PON within the CO or within another CO which is located in a position different from the CO, while sharing the SMF;

a second apparatus for combining and splitting wavelength bands being positioned at a front terminal of the splitter;

an arrayed waveguide grating (AWG) being connected to the second apparatus for combining and splitting wavelength bands which is located within the RN, being installed within the RN or within another RN which is located in a position different from the RN, and being connected to a second group of one or more ONTs by a second group of one or more distribution fibers;

a third apparatus for combining and splitting wavelength bands having a first port, a second port, and a third port, which is positioned within the RN and is provided at a back terminal of the splitter; and a fourth apparatus for combining and splitting wavelength bands having a fourth port, a fifth port, and a sixth port, which is positioned within the first group of one or more ONTs and is connected to any one ONT of the first group of one or more ONTs, and wherein the first port is connected to the splitter, the second port is connected to the fifth port through any one of the first group of one or more distribution fibers, the third port is connected to the AWG, the fourth port is connected to any one ONT of the first group of one or more ONTs, and the sixth port is connected to any one ONT of the second group of one or more ONTs.

16. The network architecture for upgrading a legacy TDM-PON to a WDM-PON based next-generation PON of claim 15, wherein the first apparatus for combining and splitting wavelength bands is comprised of a first edge filter, a second edge filter, and a first coarse wavelength division multiplexing (CWDM) filter, wherein the second apparatus for combining and splitting wavelength bands is comprised of a third edge filter, a fourth edge filter, and a second CWDM filter, wherein the third apparatus for combining and splitting wavelength bands is comprised of a fifth edge filter, a sixth edge filter, and a third CWDM filter, wherein the fourth apparatus for combining and splitting wavelength bands is comprised of a seventh edge filter, an eighth edge filter, and a fourth CWDM filter, and wherein the first apparatus for combining and splitting wavelength band, the second apparatus for combining and splitting wavelength band, the third apparatus for combining and splitting wavelength band, and the fourth apparatus for combining and splitting wavelength bands perform a function of combining and splitting signals of the legacy TDM-PON and signals of the WDM-PON, respectively.

17. A network architecture for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises:

a central office (CO) having a first optical line termination (OLT);

a remote node (RN) having a splitter;

a single mode fiber (SMF) connecting the first OLT and the splitter; and a first group of one or more optical network terminations (ONTs) being connected to the splitter by a first group of one or more distribution fibers, and wherein the network architecture further comprises:

in case that the next-generation PON is a WDM-PON, a first apparatus for combining and splitting wavelength bands being positioned between the SMF and the first OLT, in order to add a second OLT to be used for the WDM-PON within the CO or within another CO which is located in a position different from the CO, while sharing the SMF;

a second apparatus for combining and splitting wavelength bands having a first port, a second port, and a third port, being connected to a back terminal of the splitter;

a third apparatus for combining and splitting wavelength bands having a fourth port, a fifth port, and a sixth port, being connected, in parallel, to the second apparatus for combining and splitting wavelength bands at a back terminal of the splitter;

a first arrayed waveguide grating (AWG) being connected to the second apparatus for combining and splitting wavelength bands and being connected to a newly added second group of one or more ONTs by a second group of one or more distribution fibers; and a second AWG being connected to the third apparatus for combining and splitting wavelength bands and being connected to a newly added third group of one or more ONTs by a third group of one or more distribution fibers, and wherein the first AWG and the second AWG are respectively provided within the RN or within another RN which is located in a position different from the RN, wherein the first port is connected to any one ONT of the first group of one or more ONTs through the first group of one or more distribution fibers, the second port is connected to the splitter, and the third port is connected to the first AWG, and wherein the fourth port is connected to another ONT of the first group of one or more ONTs through the first group of one or more distribution fibers, the fifth port is connected to the splitter, and the sixth port is connected to the second AWG.

18. The network architecture for upgrading a legacy TDM-PON to a WDM-PON based next-generation PON of claim 17, wherein all of the second OLT of the WDM-PON, the second group of one or more ONTs, and the third group of one or more ONTs have a time division multiple access (TDMA) function.

19. The network architecture for upgrading a legacy TDM-PON to a WDM-PON based next-generation PON of claim 17, wherein the first apparatus for combining and splitting wavelength bands is comprised of a first edge filter, a second edge filter, and a first coarse wavelength division multiplexing (CWDM) filter, wherein the second apparatus for combining and splitting wavelength bands is comprised of a third edge filter, a fourth edge filter, and a second CWDM filter, wherein the third apparatus for combining and splitting wavelength bands is comprised of a fifth edge filter, a sixth edge filter, and a third CWDM filter, and wherein the first apparatus for combining and splitting wavelength band, the second apparatus for combining and splitting wavelength band, and the third apparatus for combining and splitting wavelength bands perform a function of combining and splitting signals of the legacy TDM-PON and signals of the WDM-PON, respectively.

20. The network architecture for upgrading a legacy TDM-PON to a WDM-PON based next-generation PON of claim 17, wherein a certain optical amplifier is provided between the second apparatus for combining and splitting wavelength bands and the first AWG and/or between the third apparatus for combining and splitting wavelength bands and the second AWG.

21. A network architecture for upgrading a legacy time division multiplexing-passive optical network (TDM-PON) to a wavelength division multiplexing-passive optical network (WDM-PON) based next-generation passive optical network (next-generation PON), wherein the legacy TDM-PON comprises:
   a central office (CC)) having a first optical line termination (OLT);
   a remote node (RN) having a splitter;
   a single mode fiber (SMF) connecting the first OLT and the splitter; and
   a first group of one or more optical network terminations (ONTs) being connected to the splitter by a first group of one or more distribution fibers, and wherein the next-generation PON is a WDM-PON, and wherein the network architecture further comprises:
   a first apparatus for combining and splitting wavelength bands being positioned between the SMF and the first OLT, in order to add a second OLT to be used for the WDM-PON within the CO or within another CO which is located in a position different from the CO, while sharing the SMF;
   the second OLT, being connected to the first apparatus for combining and splitting wavelength bands within the CO or within another CO which, is located in a position different from the CO, comprised of a plurality of first optical transceivers for transmitting downstream signals of the WDM-PON and receiving upstream signals thereof;
   a plurality of first WDM filters, being connected to the plurality of first optical transceivers, respectively, for splitting wavelength bands of the transmitted and received signals;
   a first arrayed waveguide grating (AWG), being connected to the plurality of first C/L WDM filters, for multiplexing and de-multiplexing the transmitted and received signals; and
   a broadband light source (BLS) with C-band and L-band, being connected to the first AWG, for providing wavelength-locked F-P LDs;
   a second apparatus for combining and splitting wavelength band, being positioned at a front terminal of the splitter;
   a second AWG, being connected to the second apparatus for combining and splitting wavelength bands and being positioned with the RN or within another RN which is located in a position different from the RN, for multiplexing and demultiplexing the transmitted and received signals;
   a second group of one or more ONTs comprised of a plurality of second optical transceivers for transmitting downstream signals of the WDM-PON and receiving upstream signals thereof; and
   a plurality of second C/L WDM filters, being connected to the plurality of second optical transceivers, respectively, through second AWG and a group of one or more distribution fibers for splitting wavelength bands of the transmitted and received signals;
   a third apparatus for combining and splitting wavelength bands having a first port, a second port, and a third port, being connected to a back terminal of the splitter; and
   a fourth apparatus for combining and splitting wavelength bands having a fourth port, a fifth port, and a sixth port, being connected to the third apparatus for combining and splitting wavelength band, wherein the third apparatus for combining and splitting wavelength bands is provided within the RN, while the fourth apparatus for combining and splitting wavelength bands is provided within the first group of one or more ONTs, wherein the first port is connected to the splitter, wherein the second port is connected to the fifth port by any one of the first group of one or more distribution fibers, wherein the third port is connected to the second AWG, wherein the fourth port is connected to any one ONT of the first group of one or more ONTs, and wherein the sixth port is connected to any one ONT of the second group of one or more ONTs.

22. The network architecture for upgrading a legacy TDM-PON to a WDM-PON based next-generation PON of claim 21, wherein a distributed feedback (DFB) laser or a Fabry-Perot laser diode (F-P LD) having 1310 nm band is used as an upstream optical source for the legacy TDM-PON, and a DFB laser or an F-P LD having 1490 nm band is be used as a downstream optical source therefore, wherein anyone among a DFB laser, a wavelength-locked F-P LD, a wavelength-seeded reflective semiconductor optical amplifier (RSOA), and wavelength tunable laser is used as an upstream optical source and a downstream optical source for the WDM-PON, and wherein each of the wavelength bands of the upstream optical source and the downstream optical source for the WDM-PON is selected from anyone among E-band, S-band, C-band, and L-band.

23. The network architecture for upgrading a legacy TDM-PON to a WDM-PON based next-generation PON of claim 21, wherein the first apparatus for combining and splitting wavelength bands is comprised of a first edge filter, a second edge filter, and a first coarse wavelength division multiplexing (CWDM) filter, wherein the second apparatus for combining and splitting wavelength bands is comprised of a third edge filter, a fourth edge filter, and a second CWDM filter, wherein the third apparatus for combining and splitting wavelength bands is comprised of a fifth edge filter, a sixth edge filter, and a third CWDM filter, wherein the fourth apparatus for combining and splitting wavelength bands is comprised of a seventh edge filter, an eighth edge filter, and a fourth CWDM filter, and wherein the first apparatus for combining and splitting wavelength band, the second apparatus for combining and splitting wavelength band, the third apparatus for combining and splitting wavelength band, and the fourth apparatus for combining and splitting wavelength bands perform a function of combining and splitting signals of the legacy TDM-PON and signals of the WDM-PON, respectively.

* * * * *